United States Patent
Bender et al.

(10) Patent No.: US 9,017,845 B2
(45) Date of Patent: *Apr. 28, 2015

(54) ELECTRIC ENERGY STORAGE DEVICE FOR A MOTOR VEHICLE

(75) Inventors: Stefan Bender, Ludwigsburg (DE); Steffen Maurer, Stuttgart (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 302 days.

This patent is subject to a terminal disclaimer.

(21) Appl. No.: 13/371,709

(22) Filed: Feb. 13, 2012

(65) Prior Publication Data
US 2012/0208058 A1 Aug. 16, 2012

(30) Foreign Application Priority Data
Feb. 14, 2011 (DE) .................. 10 2011 000 693

(51) Int. Cl.
*H01M 2/10* (2006.01)
*B60K 1/04* (2006.01)
*B60L 11/18* (2006.01)

(52) U.S. Cl.
CPC ............ *H01M 2/1083* (2013.01); *B60K 1/04* (2013.01); *B60L 11/1879* (2013.01); *Y02T 10/7005* (2013.01); *Y02T 10/705* (2013.01); *Y02T 10/70* (2013.01)

(58) Field of Classification Search
CPC ....... H01M 2/00; H01M 2/02; H01M 2/0237; H01M 2/025; H01M 2/0255
USPC .......................................... 429/100
See application file for complete search history.

(56) References Cited

U.S. PATENT DOCUMENTS 6,472,098 B1* 10/2002 Sawada et al. ............ 429/163
2011/0294000 A1* 12/2011 Kim et al. ................. 429/176

FOREIGN PATENT DOCUMENTS

| DE | 10 2008 010 829 | 11/2009 |
| DE | 102008010829 | * 11/2009 |
| DE | 10 2008 059 680 | 6/2010 |
| DE | 20 2009 008 503 | 12/2010 |

OTHER PUBLICATIONS

English translation of DE102008010829, Schroeter et. al, Nov. 2009.*

* cited by examiner

*Primary Examiner* — Jonathan Jelsma
*Assistant Examiner* — Rashid Alam
(74) *Attorney, Agent, or Firm* — Gerald E. Hespos; Michael J. Porco; Matthew T. Hespos

(57) ABSTRACT

An electric energy storage device (10) for a motor vehicle, in particular a high-voltage energy storage device for a hybrid vehicle or an electric vehicle, having a housing (11) and having storage modules (12) accommodated in the housing. The housing (11) has a housing top part (15), a housing bottom part (16) and a supporting element (17) with an annular supporting frame (18). The housing bottom part (15) and the housing top part (16) are connected detachably to the supporting frame (18), which is positioned between them. The annular supporting frame (18) has fastening sections (19, 20) for detachably connecting the electric energy storage device to a body structure of a motor vehicle.

17 Claims, 3 Drawing Sheets

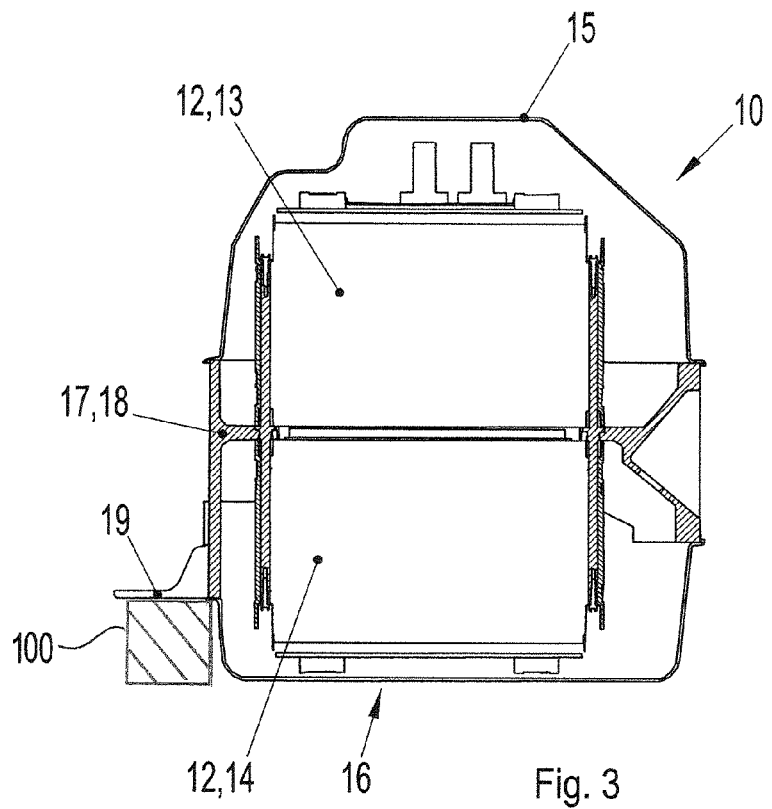
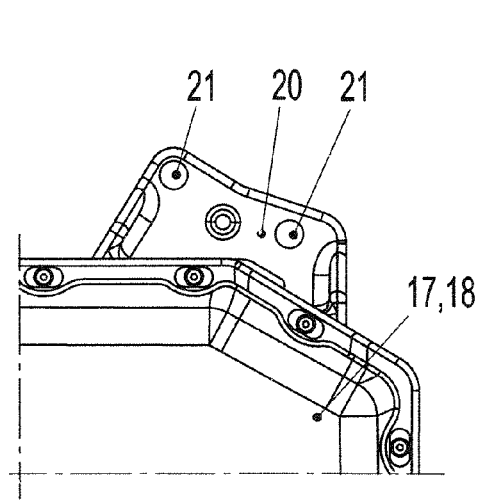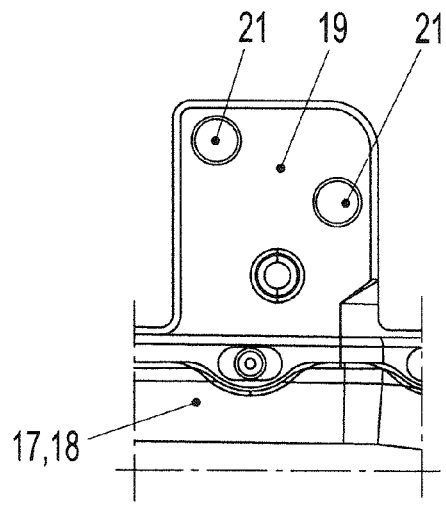
Fig. 3
Fig. 4
Fig. 5

ELECTRIC ENERGY STORAGE DEVICE FOR A MOTOR VEHICLE

CROSS REFERENCE TO RELATED APPLICATION

This application claims priority under 35 USC 119 to German Patent Appl. No. 10 2011 000 693.1 filed on Feb. 14, 2011, the entire disclosure of which is incorporated herein by reference.

BACKGROUND OF THE INVENTION

1. Field of the Invention

The invention relates to an electric energy storage device for a motor vehicle, such as a high-voltage energy storage for a hybrid or electric vehicle.

2. Description of the Related Art

High-voltage energy storage devices used in hybrid vehicles or electric vehicles are discharged relatively intensely when an electric machine of the vehicle is operated in motor mode and are charged relatively intensely when the electric machine is operated in generator mode. Electric energy storage devices have a housing and storage modules accommodated in the housing.

Separate devices are used in the prior art to position and mount an electric energy storage device in the motor vehicle. Thus, DE 10 2008 059 680 A1 discloses a battery holding device that comprises a tray-like holding element to accommodate a battery, a clip enclosing the tray-like holding element, and a fixing element fastened on the clip and used to fix the battery in the tray-like holding element. Thus, a separate device is required in the prior art to fasten or mount an electric energy storage device in the motor vehicle. This increases the number of devices that have to be installed in the motor vehicle and, as a result, increases the weight of the vehicle.

It is the underlying object of the present invention to provide a novel electric energy storage device for a motor vehicle.

SUMMARY OF THE INVENTION

The invention relates to an electric energy storage device with a housing that has a housing top part, a housing bottom part and a supporting element with an annular supporting frame. The housing bottom part and the housing top part are connected detachably to the annular supporting frame, which is positioned between them. The annular supporting frame has fastening sections that detachably connect the energy storage device to a body structure of a motor vehicle.

The electric energy storage device of the invention has a supporting element with an annular supporting frame that is an integral part of the housing of the electric energy storage device. Accordingly, the electric energy storage device of the invention can be fastened on a body structure of a motor vehicle directly by means of the housing, namely the supporting element of the housing. As a result, there is no need for a separate device for fastening an electric energy storage device in the motor vehicle.

The housing bottom part and the housing top part are detachably connected to the annular supporting frame. The annular supporting frame absorbs all forces and moments acting on the electric energy storage device. The housing bottom part and the housing top part therefore can be embodied as non-load-bearing components of the housing which can have a low weight. With the invention, it is thus possible to reduce the number of devices to be installed and to reduce the weight of the motor vehicle.

The storage modules preferably comprise first and second module packs. The first module pack has storage modules fastened on the annular supporting frame from above and rest on the annular supporting frame. The second module pack has storage modules fastened on the annular supporting frame from below and hang from the annular supporting frame. The housing top part covers the storage modules of the first module pack and the housing bottom part covers the storage modules of the second module pack. This electric energy storage device has two module packs, the storage modules of which are connected to the annular supporting frame. All of the storage modules are individually accessible and replaceable and the electric energy storage device has a compact and light construction.

Preferred developments of the invention will emerge from the following description. Embodiments of the invention are explained in greater detail with reference to the drawing, although the invention is not limited to these.

BRIEF DESCRIPTION OF THE DRAWINGS

FIG. 2 is another perspective view of the electric energy storage device of the invention shown in FIG. 1, with storage modules showing through.

FIG. 3 is a cross section through the electric energy storage device.

FIG. 4 is a first fastening section of the electric energy storage device.

FIG. 5 is a second fastening section of the electric energy storage device of the invention.

DETAILED DESCRIPTION OF THE PREFERRED EMBODIMENTS

Figure 1:
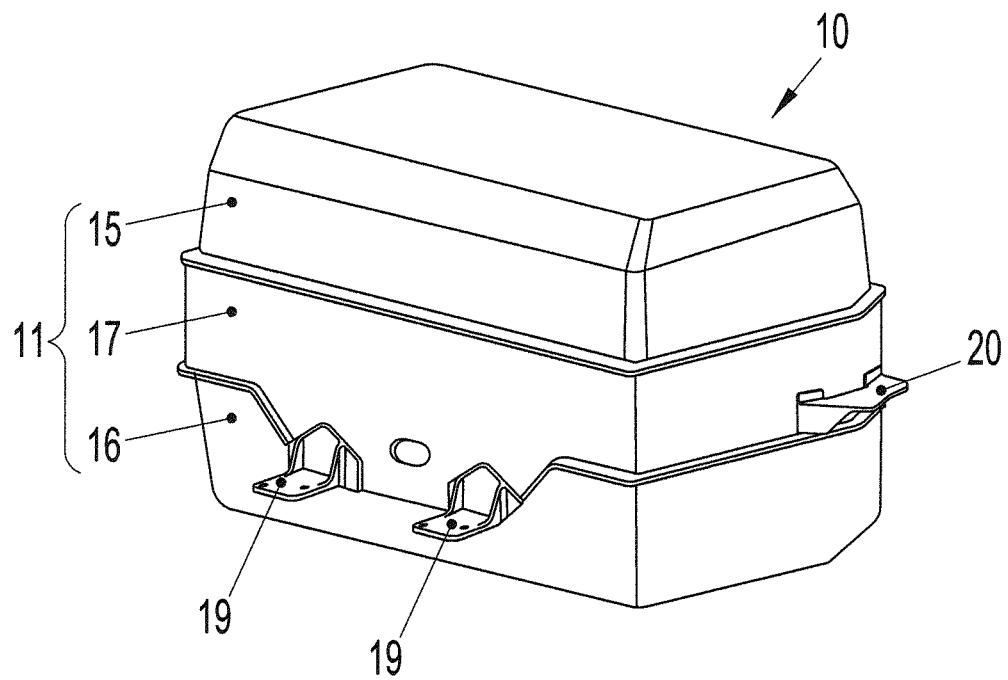
FIG. 1 is a perspective view of one embodiment of an electric energy storage device according to the invention.
Figure 2:
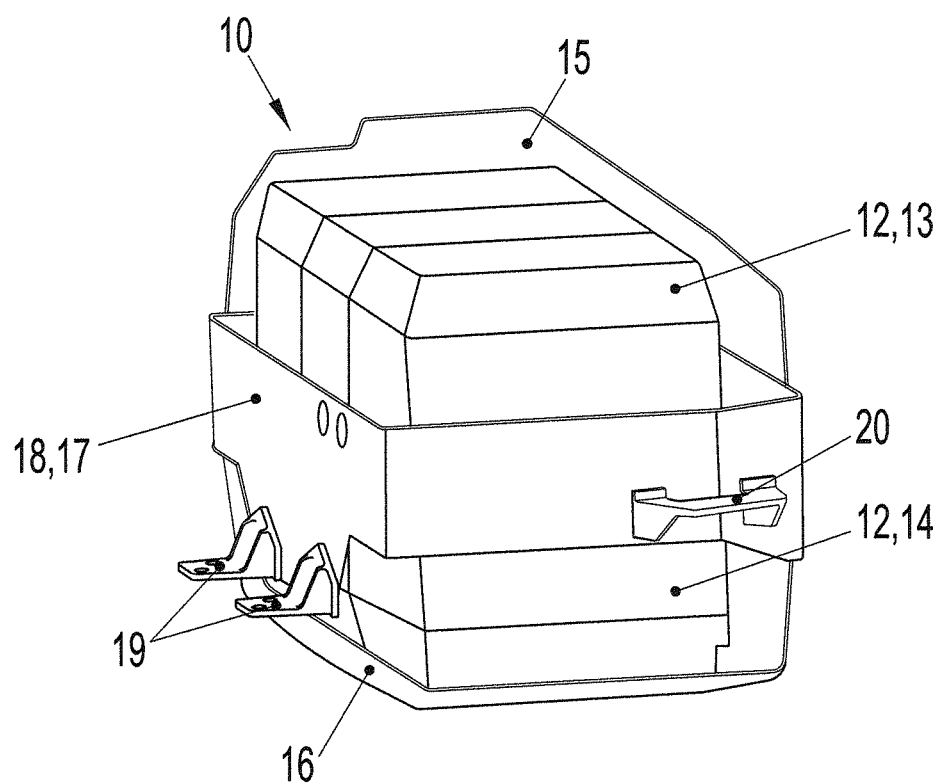

The invention relates to an electric energy storage device for a motor vehicle, in particular a high-voltage energy storage device for a hybrid vehicle or an electric vehicle. A drive unit of a hybrid vehicle or an electric vehicle comprises an electric machine that can be operated as a motor and as a generator. The high-voltage energy storage device is discharged relatively intensely by the electric machine when the electric machine is operated as a motor. The high-voltage energy storage device is charged relatively intensely by the electric machine when the electric machine is operated as a generator.

The electric energy storage device 10 has a housing 11 and storage modules 12 accommodated in the housing 11. The storage modules 12 form a first, upper module pack 13 with a plurality of storage modules 12, and a second, lower module pack 14 with a plurality of storage modules 12.

The housing 11 of the electric energy storage device 10 has a housing top part 15, a housing bottom part 16 and a supporting element 17, which comprises an annular supporting frame 18. The housing top part 15 and the housing bottom part 16 are detachably connected to the annular supporting frame 18 of the housing 10, which is positioned between the housing top part 15 and the housing bottom part 16.

The housing top part 15, the housing bottom part 16 and the supporting element 17 or supporting frame 18 together form the housing 11 of the electric energy storage device 10.

The electric energy storage device 10 can be connected to the body structure of a motor vehicle only via the supporting frame 18. More particularly, fastening sections 19, 20 are formed as an integral part of the supporting frame 18 and have apertures 21, through which fastening screws (not shown) extend to fasten the electric energy storage device 10 on a body structure or the motor vehicle.

All forces and moments acting on the electric energy storage device 10 are absorbed by the supporting frame 18 or supporting element 17. The supporting element 17 or annular supporting frame 18 preferably is made of metal, e.g. high-strength aluminum or a high-strength aluminum alloy. The housing top part 15 and the housing bottom part 16, on the other hand, are non-load-bearing cover-type components that do not absorb forces and moments. The housing top part 15 and the housing bottom part 16 of the housing 11 therefore can be extremely thin-walled and light. The housing top part 15 and the housing bottom part 16 preferably are made from plastic, in particular a fiber-reinforced plastic.

The storage modules 12 form the two module packs 13 and 14, as explained above. The storage modules 12 of the first, upper module pack 13 are fastened on the annular supporting frame 18 and hence on the supporting element 17 from above and rest on the supporting element 17. The storage modules 12 of the second, lower module pack 14 are fastened on the annular supporting frame 18 and hence on the supporting element 17 from below and hang from the supporting element 17.

Figure 6:
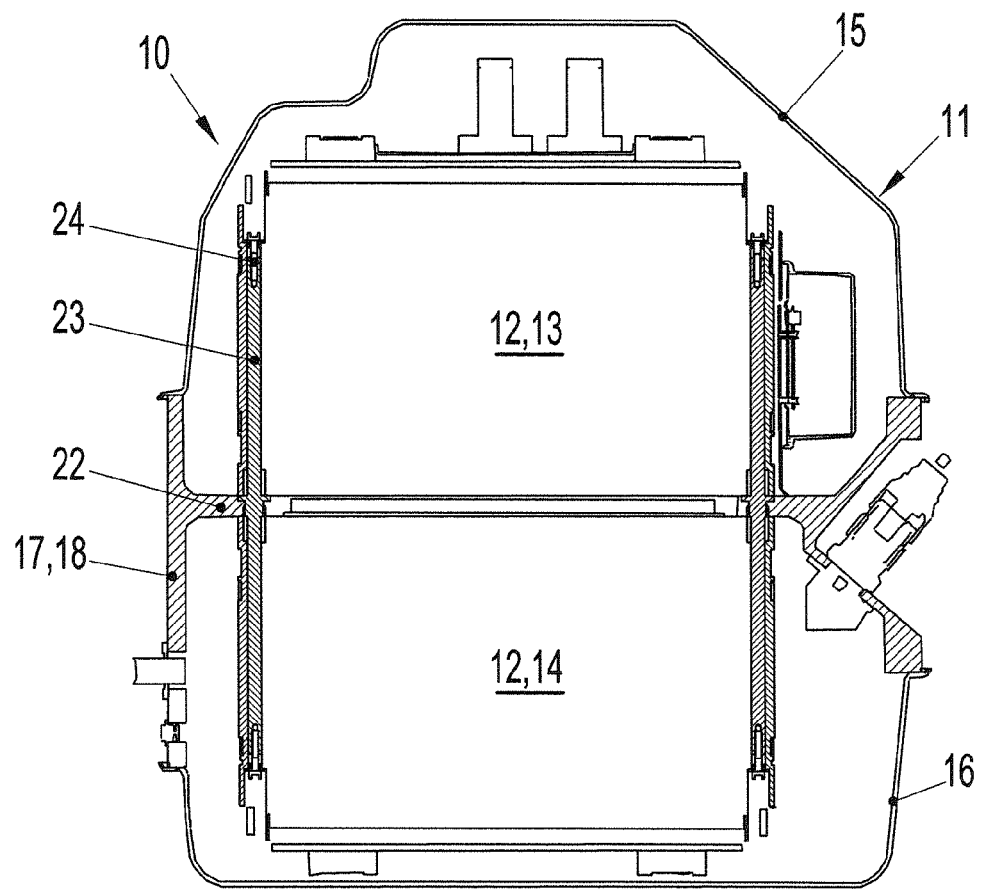
FIG. 6 is another cross section through the electric energy storage device of the invention.
Figure 7:
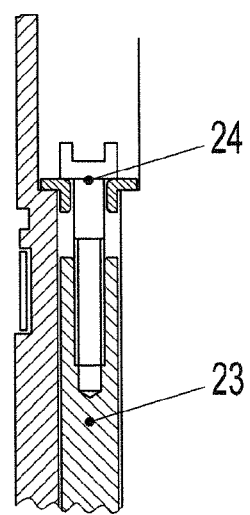
FIG. 7 shows a detail from FIG. 6.

FIGS. 6 and 7 show a preferred variant for connecting the storage modules 12 of the two module packs 13 and 14 to the annular supporting frame 18. FIG. 6 shows that the storage modules 12 of the two module packs 13 and 14 are mounted on a section 22 of the supporting frame 18 that projects into the interior of the housing 11 by means of fastening bolts 23 and fastening screws 24. The fastening bolts 23 are screwed to the inward-projecting section 22 of the supporting frame 18 and pass through openings in the storage modules 12, with the storage modules 12 being mounted on the fastening bolts 23 by the fastening screws 24 that are screwed into the fastening bolts 23. Hence, the storage modules 12 are secured on the supporting frame 18 by the fastening bolts 23. Each storage module 12 is fastened individually on the inward-projecting section 22 of the supporting frame 18 by the fastening bolts 23 and fastening screws 24. All of the storage modules 12 of the module packs 13, 14 thus are individually accessible and individually replaceable. In the fully mounted state, the housing top part 15 covers the storage modules 12 of the first, upper module pack 13, while the housing bottom part 16 covers the storage modules 12 of the second, lower module pack 14.

The annular supporting frame 18 of the supporting element 17 partially encloses mutually facing sections of the module packs 13 and 14. In sections adjoining these sections, the storage modules of the respective module packs 13 and 14 project relative to the annular supporting frame 18.

The electric energy storage device 10 according to the invention can be mounted in a motor vehicle while minimizing the required subassemblies and the required installation space and weight. All forces and moments are absorbed by the supporting element 17, namely by the annular supporting frame 18. Other components of the housing, namely the housing top part 15 and the housing bottom part 16, are non-load-bearing subassemblies. As a result, it is possible to reduce the total weight.

What is claimed is:

1. An electric energy storage device for a motor vehicle, comprising: a housing having a supporting element with an annular supporting frame, the annular supporting frame having an open top and an open bottom, the supporting element further having fastening sections projecting out from the annular supporting frame and configured for detachably connecting the electric energy storage device to a body structure of a motor vehicle, at least one storage module support projecting in from the annular supporting frame, the housing further having a non-load-bearing housing top part and a non-load-bearing housing bottom part detachably connected respectively to the open top and the open bottom of the supporting frame; and storage modules mounted to the storage module support at positions spaced inward of the annular supporting frame of the housing.

2. The electric energy storage device of claim 1, wherein the housing top part and the housing bottom part are non-load-bearing covers that cover the storage modules.

3. The electric energy storage device of claim 2, wherein the housing top part and the housing bottom part are manufactured from plastic or a fiber-reinforced plastic.

4. The electric energy storage device of claim 2, wherein at least the supporting frame of the supporting element is manufactured from metal.

5. The electric energy storage device of claim 4, wherein at least the supporting frame of the supporting element is manufactured from aluminum or an aluminum alloy.

6. The electric energy storage device of claim 1, wherein the storage modules are detachably connected to the storage module support projecting in from the annular supporting frame of the supporting element.

7. The electric energy storage device of claim 6, wherein the storage modules comprise first and second module packs of the storage modules, the first module pack having a first plurality of the storage modules fastened from above on storage module support projecting in from the annular supporting frame and resting on the storage module support projecting in from the annular supporting frame, the second module pack having a second plurality of the storage modules fastened from below on the storage module support projecting in from the annular supporting frame and hanging from the storage module support projecting in from the annular supporting frame.

8. The electric energy storage device of claim 7, wherein the two module packs are disposed in mutually facing relationship and the annular supporting frame partially encloses the two module packs.

9. The electric energy storage device of claim 1, wherein the fastening sections are webs and are integral with the supporting frame.

10. A hybrid or electric motor vehicle, comprising:
a body structure; and
a high-voltage energy storage device with a housing having an annular supporting frame that has an open top and an open bottom, fastening sections projecting integrally out from the annular supporting frame and detachably connecting the electric energy storage device to the body structure of the vehicle, at least one storage module support projecting in from the annular supporting frame, a housing top part and a housing bottom part detachably connected respectively to the open top and the open bottom of supporting frame; and storage modules mounted to the storage module support at positions spaced inward of the annular supporting frame of the housing.

11. The hybrid or electric motor vehicle of claim 10, wherein the housing top part and the housing bottom part are non-load-bearing covers.

12. The hybrid or electric motor vehicle of claim 11, wherein the housing top part and the housing bottom part are manufactured from plastic or a fiber-reinforced plastic.

13. The hybrid or electric motor vehicle of claim 11, wherein at least the supporting frame of the supporting element is manufactured from metal.

14. The hybrid or electric motor vehicle of claim 13, wherein at least the supporting frame of the supporting element is manufactured from aluminum or an aluminum alloy.

15. The hybrid or electric motor vehicle of claim 10, wherein the storage modules are detachably connected to the storage module support projecting in from the annular supporting frame of the supporting element.

16. The hybrid or electric motor vehicle of claim 15, wherein the storage modules comprise first and second module packs of the storage modules, the first module pack having a first plurality of the storage modules fastened from above on the storage module support projecting in from the annular supporting frame and resting on the storage module support projecting in from the annular supporting frame, the second module pack having a second plurality of the storage modules fastened from below on the storage module support projecting in from the annular supporting frame and hanging from the storage module support projecting in from the annular supporting frame.

17. The hybrid or electric motor vehicle of claim 16, wherein the two module packs are disposed in mutually facing relationship and the annular supporting frame partially encloses the two module packs.

\* \* \* \* \*